No. 816,089. PATENTED MAR. 27, 1906.
R. W. HARGRAVE.
SPEED METER.
APPLICATION FILED MAY 22, 1905.

Witnesses
Claude J. Fry
Walter C. Willard

Inventor
Russell W. Hargrave

UNITED STATES PATENT OFFICE.

RUSSELL W. HARGRAVE, OF ANN ARBOR, MICHIGAN.

SPEED-METER.

No. 816,089.     Specification of Letters Patent.     Patented March 27, 1906.

Application filed May 22, 1905. Serial No. 261,601.

*To all whom it may concern:*

Be it known that I, RUSSELL WILLIAM HARGRAVE, a citizen of the United States, residing at Ann Arbor, in the county of Washtenaw and State of Michigan, have invented a new and useful Speed-Meter, of which the following is a specification.

My invention is a speed-meter in which a fan-wheel produces and circulates currents of air or gas in an inclosed case, which currents acting upon a second fan-wheel cause it to rotate against the restraining action of a spring, the amount of this rotation being indicated by graduations.

The object of my invention is to measure speed, which I do by means of the mechanism illustrated in the accompanying drawings, in which—

Figure 1:
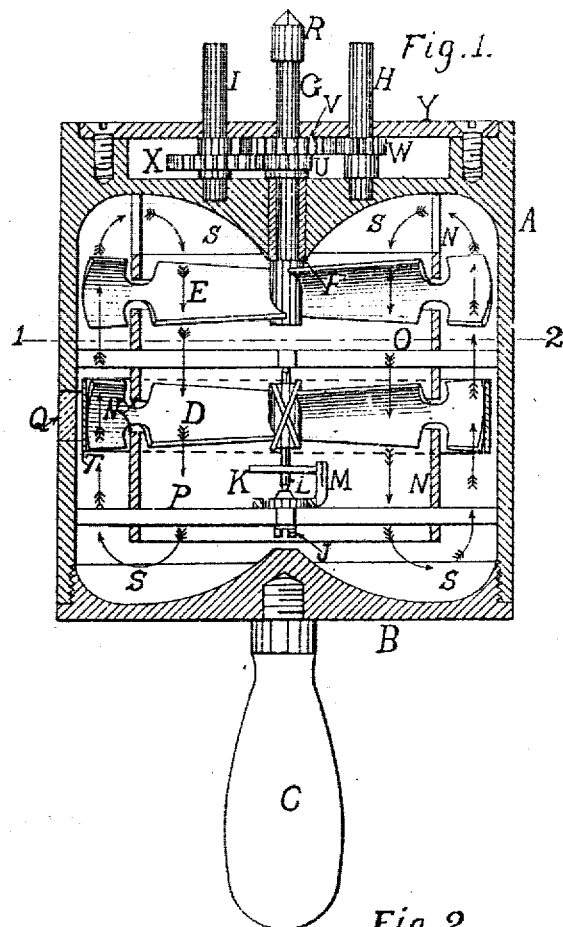
Figure 2:
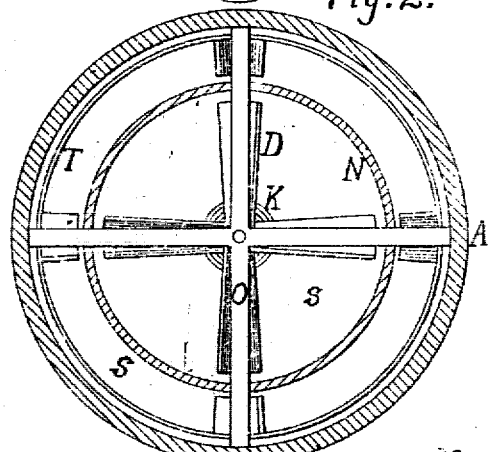

Figure 1 is a partial section taken through the axis of the cases of the meter and shows the interior mechanism of the meter. Fig. 2 is a section through the cases on the line 1 2 at right angles to the axis of the cases and looking toward the handle C.

Similar letters refer to similar parts in both views.

The casing A forms the main framework of the machine. In one end of this is fastened the cap B, to which may be fastened the handle C. The other end of the casing contains the mechanism for driving the fan-wheel E. This mechanism consists of the main spindle G, which runs in the bearing-sleeve F and is direct-connected to fan-wheel E, the auxiliary spindle I, which is connected to the spindle G by the gears X and U, and the auxiliary spindle H, which is connected to spindle G by the gears W and V. The cap Y closes the outer end of this case. Upon the outer end of either I, G, or H is placed any suitable device, as. R, for connecting the meter to the mechanism the speed of which is desired.

O and P are braces which support parts of the inner casing N and the bearings of the spindle L. To L is fastened the fan-wheel D. The periphery of D is formed by the rim T, upon which are placed the graduations, which can be read through the glass or other transparent substance which closes the opening Q in the case.

J is a screw for the adjustment of the spindle L. K is a spring or springs for resisting the rotation of the wheel D. One end of K is fastened to the spindle L. The other end is fastened in the clamp M, which may be rotated about the screw J as a center and fixed in any angular position to adjust the location of the zero of the graduations.

N is an inner casing to assist in the complete circulation and separation of the oppositely-traveling currents produced by the fan-wheel E. The different parts of N are supported by P, O, and the end of the casing A. Fan-wheel E is a double wheel having inner and outer vanes so formed as to produce when rotated currents approximately equal in velocity, but opposite in direction, at the inner and outer portions of the wheel, as shown by the arrows on the drawings. Fan-wheel D has vanes similar to those of E and when acted upon by the oppositely-moving currents produced by E rotates, the amount of this rotation being indicated by the graduations upon its rim, thus indicating the speed. For the sake of simplicity these fan-wheels are shown with two or four double vanes, respectively, but may have any number of vanes desired.

The passage S is formed as shown to reduce friction and the formation of eddy-currents as much as possible and also to equally deflect the currents striking the ends of the passage, the object being to produce currents the velocity of which will be as nearly proportional to the speed of rotation of E as possible, and these will therefore produce in D an amount of rotation similarly proportional.

My meter is an improvement over other pneumatic speed-meters because of the free and complete circulation of and because of the diminution of friction and eddy-currents in the currents produced by the impelling fan-wheel, due to the arrangement of the fan-wheels and the shape of the passage S. My meter is also an improvement because of the greater sensitiveness produced by the use of the double fan-wheel.

It will of course be understood that many variations may be made in the form and details of construction without departing from my invention.

What I claim as my invention and desire to secure by Letters Patent, is—

1. The combination in a speed-meter of an inclosed case in which are arranged coaxially and to rotate two fans, having vanes with opposite pitches at their inner and outer portions, corresponding portions of the vanes of each fan having the same pitch, substantially as described.

2. The combination in a speed-meter of a case in which are arranged coaxially and to rotate two fans having vanes with opposite pitches, at their inner and outer portions, corresponding portions of the vanes of each wheel having the same pitch, and of an inner casing N to assist in the complete separation of the oppositely-traveling currents produced by the oppositely-pitched inner and outer portions, of the vanes of the impelling-fan when it is revolved, all substantially as described.

3. The combination in a speed-meter of a propelling fan-wheel E, a recording fan-wheel D, restrained by the spring K, and of the outer case A, the inner case N, together with the end B, forming the passage S, all substantially as described.

In testimony whereof I have signed my name to this specification in the presence of two witnesses.

RUSSELL W. HARGRAVE.

Witnesses:
A. S. BERRY.
CLAUDE J. FRY.